US012754326B2

(12) United States Patent
Strus et al.

(10) Patent No.: US 12,754,326 B2
(45) Date of Patent: Oct. 6, 2026

(54) ESTIMATING RELATIVE POSITION OF A RECEIVER FOR A GLOBAL NAVIGATION SATELLITE SYSTEM (GNSS) USING TIME DOMAIN RECURSIVE FILTERING

(71) Applicant: SRI International, Menlo Park, CA (US)

(72) Inventors: Joseph M. Strus, Redwood City, CA (US); Christian Gellrich, Redwood City, CA (US)

(73) Assignee: SRI International, Menlo Park, CA (US)

( * ) Notice: Subject to any disclaimer, the term of this patent is extended or adjusted under 35 U.S.C. 154(b) by 266 days.

(21) Appl. No.: 18/600,345

(22) Filed: Mar. 8, 2024

(65) Prior Publication Data

US 2024/0302538 A1 Sep. 12, 2024

Related U.S. Application Data

(60) Provisional application No. 63/451,033, filed on Mar. 9, 2023.

(51) Int. Cl.
*G01S 19/24* (2010.01)

(52) U.S. Cl.
CPC .................................... *G01S 19/24* (2013.01)

(58) Field of Classification Search
CPC .......... G01S 19/04; G01S 19/24; G01S 19/44; G01S 19/51; G01S 19/55
USPC .......................................................... 342/350
See application file for complete search history.

(56) References Cited

U.S. PATENT DOCUMENTS

| | | | | |
|---|---|---|---|---|
| 5,451,964 | A | 9/1995 | Babu | |
| 5,739,785 | A | 4/1998 | Allison et al. | |
| 5,867,411 | A | 2/1999 | Kumar | |
| 5,933,110 | A | 8/1999 | Tang et al. | |
| 6,127,968 | A | 10/2000 | Lu | |
| 6,259,398 | B1 | 7/2001 | Riley | |
| 6,397,147 | B1 | 5/2002 | Whitehead | |
| 6,421,003 | B1 | 7/2002 | Riley et al. | |
| 7,403,558 | B2 * | 7/2008 | Mattos | G01S 19/37 375/150 |
| 7,961,145 | B1 | 6/2011 | Strus et al. | |
| 2008/0272961 | A1 | 11/2008 | Wirola et al. | |
| 2013/0229310 | A1 * | 9/2013 | Parks | G01S 5/0284 342/417 |
| 2022/0326393 | A1 * | 10/2022 | Berntorp | G01S 19/09 |

* cited by examiner

*Primary Examiner* — Brady W Frazier
(74) *Attorney, Agent, or Firm* — Shumaker & Sieffert, P.A.

(57) ABSTRACT

In general, the disclosure describes techniques for estimating a relative position of a receiver in a global navigation satellite system (GNSS) using time domain recursive filtering applied to GNSS data for an additional plurality of receivers. For example, multiple receivers each obtains GNSS data that indicates the raw position information for the receiver. A system applying techniques described herein may use the GNSS data, obtained for each receiver of the additional plurality of receivers, to improve position accuracy for a particular receiver using time domain recursive filtering.

20 Claims, 3 Drawing Sheets

ESTIMATING RELATIVE POSITION OF A RECEIVER FOR A GLOBAL NAVIGATION SATELLITE SYSTEM (GNSS) USING TIME DOMAIN RECURSIVE FILTERING

RELATED APPLICATIONS

This application claims the benefit of U.S. Provisional Patent Application No. 63/451,033, filed 9 Mar. 2023, the entire contents of which is incorporated herein by reference.

TECHNICAL FIELD

This disclosure relates to satellite navigation systems and relates more particularly to relative positioning techniques for use with satellite navigation systems.

BACKGROUND

Global navigation satellite systems (GNSS), such as the Global Positioning System (GPS), provide autonomous geo-spatial positioning with global coverage. GNSS satellites broadcast signals from space that receivers use to estimate their three-dimensional location (latitude, longitude, and altitude). Global positioning system (GPS), GLONASS, Galileo, BeiDou Navigation Satellite System (BDS), and NavIC may be considered examples of a GNSS system.

Currently, two main types of positioning are used by GNSS: absolute positioning and relative positioning. Absolute positioning attempts to find a user's position relative to an absolute (i.e., latitude, longitude) coordinate system. Relative positioning attempts to find the position of a first user (a "rover") relative to a second user (a "reference"). In the latter case, both users may be stationary, both users may be moving, or one user may be stationary and one user may be moving.

Typically, a GNSS receiver makes two measurements in order to perform relative positioning: a code measurement and a carrier phase measurement. These measurements are used to estimate the distance from the user to the satellite transmitter. However, ambiguity in the carrier phase measurement may jeopardize the accuracy of this process. Dual-frequency (L1/L2) GNSS receivers are typically able to compensate for the ambiguity because they make a second set of linearly independent code and carrier phase measurements. However, less expensive single-frequency (L1) GNSS receivers are not able to take advantage of such additional measurements.

SUMMARY

In general, the disclosure describes techniques for estimating a relative position of a receiver in a global navigation satellite system (GNSS) using time domain recursive filtering applied to GNSS data for an additional plurality of receivers, in accordance with the techniques of the disclosure. For example, multiple receivers each obtains GNSS data that indicates the raw position information for the receiver. A system applying techniques described herein may use the GNSS data, obtained for each receiver of the additional plurality of receivers, to improve position accuracy for a particular receiver using time domain recursive filtering. The system may be a phone or other portable device that includes a GNSS sensor (i.e., the receiver) or can be a backend system. In some examples, additional data from other sensors may be used in combination with the GNSS to estimate the relative position of the receiver. Such additional data may include base station measurement data indicating time, angle, and/or range information between a receiver and a base station, or other sensor data indicating an image, orientation, temperature, pressure, acceleration, and/or sound sensed at the receiver.

The techniques may provide one or more technical advantages that realize at least one practical application. For example, using information for an additional plurality of receivers allows for improvements in accuracy to achieve a more robust solution for estimating the position of a particular receiver. Improved location accuracy (both absolute and relative) achieved by the described techniques may reduce traffic fatalities and collisions. For example, by using higher accuracy GNSS solutions in accordance with aspects of this disclosure, better base positions from which trajectory predictions can be extrapolated as well as more accurate short-term metrics to determine erratic drivers and their immediate impact may be obtained. In another example, using data from an additional plurality of receivers, in accordance with aspects of this disclosure, may be particularly useful to improve the relation position accuracy of a receiver in an urban canyon environment subject to biases in the simple carrier phase and ranging solution caused by multipathing.

In one example, a method for estimating a position of a first receiver comprises obtaining, by a computing system, a first set of measurements for the first receiver, wherein the first set of measurements includes data indicating distances between the first receiver and a plurality of satellites; obtaining, by the computing system, a plurality of sets of measurements for a plurality of receivers, wherein each set of measurements of the plurality of sets of measurements includes data indicating distances between a corresponding receiver of the plurality of receivers and the plurality of satellites; performing, by the computing system, a time domain recursive filtering in accordance with the first set of measurements for the first receiver and the plurality of sets of measurements, wherein the time domain recursive filtering produces at least one set of double difference float ambiguities, each double difference float ambiguity in the set of double difference float ambiguities being averaged over a period of time; and estimating, by the computing system, the position of the first receiver relative to the plurality of receivers in accordance with the time domain recursive filtering.

In another example, a computing system comprises processing circuitry and memory, the processing circuitry configured to: obtain a first set of measurements for the first receiver, wherein the first set of measurements includes data indicating distances between the first receiver and a plurality of satellites; obtain a plurality of sets of measurements for a plurality of receivers, wherein each set of measurements of the plurality of sets of measurements includes data indicating distances between a corresponding receiver of the plurality of receivers and the plurality of satellites; perform a time domain recursive filtering in accordance with the first set of measurements for the first receiver and the plurality of sets of measurements, wherein the time domain recursive filtering produces at least one set of double difference float ambiguities, each double difference float ambiguity in the set of double difference float ambiguities being averaged over a period of time; and estimate the position of the first receiver relative to the plurality of receivers in accordance with the time domain recursive filtering.

In another example, computer-readable storage media comprises instructions that, when executed by processing circuitry, cause the processing circuitry to: obtain a first set of measurements for the first receiver, wherein the first set of measurements includes data indicating distances between the first receiver and a plurality of satellites; obtain a plurality of sets of measurements for a plurality of receivers, wherein each set of measurements of the plurality of sets of measurements includes data indicating distances between a corresponding receiver of the plurality of receivers and the plurality of satellites; perform a time domain recursive filtering in accordance with the first set of measurements for the first receiver and the plurality of sets of measurements, wherein the time domain recursive filtering produces at least one set of double difference float ambiguities, each double difference float ambiguity in the set of double difference float ambiguities being averaged over a period of time; and estimate the position of the first receiver relative to the plurality of receivers in accordance with the time domain recursive filtering.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
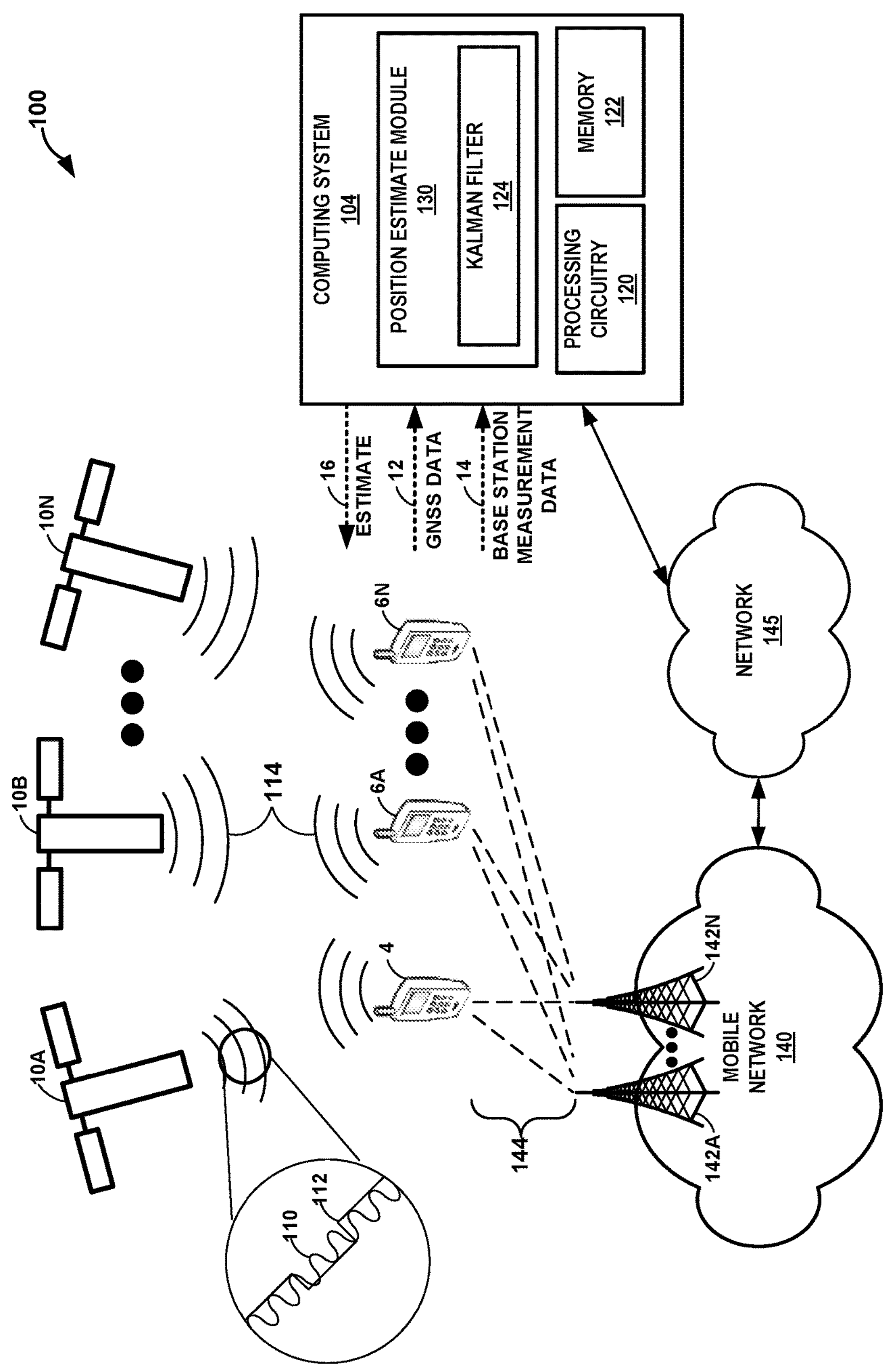
FIG. 1 is a block diagram illustrating an example system for estimating a relative position of a receiver in a global navigation satellite system (GNSS) using time domain recursive filtering applied to GNSS data for an additional plurality of receivers, in accordance with techniques of the disclosure.

In general, techniques are described for estimating relative position for a receiver in a global navigation satellite system using raw position information for a plurality of additional receivers. The techniques can be used in single-frequency GNSS receivers to obtain the same relative accuracy that is achieved by more expensive dual-frequency receivers. In some examples, this is made possible by using time domain filtering of the single-frequency measurements.

In one example, the measurements include data from a plurality of GNSS receivers. Beginning about 2019, Android began supporting the collection and instrumentation of raw GNSS data from cellphone GNSS chipsets. This means that the raw GNSS data (not just the phone derived position) is available across potentially thousands of phones/receivers. U.S. Pat. No. 7,961,145, issued Jun. 14, 2011, which is incorporated by reference herein in its entirety, describes an algorithm that provide accurate relative location between two users in motion or not, using raw GNSS data. The algorithms are based on data from two receivers A and B to estimate a relative position of one of the receivers. The techniques of this disclosure extend and improve upon the algorithms to incorporate raw GNSS data for a plurality of additional receivers to improve relative position accuracy for a receiver.

The term "urban canyon" may be used to describe a situation where multipath signals to a receiver may be stronger than a direct path signal to the receiver. This typically occurs in an environment with tall buildings and structures on either side of a street (e.g., a city or urban environment). Multipath effects may introduce an error into a signal that is consistent and does not average out. The structures create a canyon-like effect where the line of sight between a GNSS receiver and a satellite is obstructed or significantly limited. In an urban canyon, pedestrians and automobiles have poor GNSS accuracy due to multipath and occlusion of direct GNSS signals. However, some receivers located in or near an urban canyon may still receive direct GNSS signals. For example, some people may have their cell phones with them as they sit at rooftop restaurants or work at a location in an office building with a direct line of sight to a satellite. The raw GNSS data for such receivers is less subject to multipath biases, and thus the computed position information for such receivers remains accurate relative to receivers subject to more multipath signals (e.g., receivers in the depths of the urban canyon).

In accordance with aspects of this disclosure, using the information from a plurality of receivers (some of which have more accurate measurements than others) allows for improvements in accuracy. In one example, absolute position accuracy and relative position accuracy between the receivers located the rooftops and receivers located on the street can be exploited. For instance, a plurality of receivers may compare a pseudorange, Doppler, and carrier phase to determine the apparent angle of incoming energy from a satellite. If one or more receivers is dominated by multipath, a determination may be made that this component should not be used as part of the overall solution. In another example, the combination of spatial and temporal filtering may be used.

Reasonable accuracy can be obtained in a single data epoch (i.e., a single measurement-typically one millisecond for a GPS system), but by using updated models or a time domain sequential filter, substantial improvements in accuracy can be obtained. In one example, information from multiple receivers may be shared among the receivers or aggregated on a separate computing system to compute relative position information for a receiver.

FIG. 1 is a block diagram illustrating an example system for estimating a relative position of a receiver in a global navigation satellite system (GNSS) using time domain recursive filtering applied to GNSS data for an additional plurality of receivers, in accordance with techniques of the disclosure. The system 100 comprises a GNSS receiver 4, a plurality of additional GNSS receivers 6A-6N (collectively, "receivers 6" or "additional receivers 6"), and a plurality of GNSS satellites 10A-10N (collectively, "satellites 10"). In the illustrated example, the system 100 comprises a mobile network 140, network 145, and computing system 104.

The satellites 10 broadcast and receive signals 114 (illustrated as three curved lines in FIG. 1) from orbital positions that are known as a function of time. In one example, the signals are GNSS signals, for one or more GNSS systems. These signals contain a sinusoidal carrier component 110 modulated by a coarse acquisition (C/A) pseudo-random noise (PRN) code component 112. The C/A signals may result in a ranging estimate (i.e., code delay).

The code component 112 has a superimposed digital data stream that contains information about the satellite ephemeris, clock bias terms, and other data. The GNSS code component serves as the basis for estimating the arrival time of a signal from a satellite. The combination of the information in the code component 112 and the digital data allows the plurality of receivers 6 and receiver 4 to compute the positions of the broadcasting satellites 10.

Specifically, the code component 112 allows unambiguous determination of the length of the transmission path from the satellite 10 to the receiver. However, path length based on the code component 112 can only be measured to a relatively coarse resolution. Finer resolution requires measurement of the carrier component 110.

When the phase of the carrier component 110 is determined at the receiver, it is ambiguous which specific cycle of the carrier wave is being measured. Thus, the carrier component 110 cannot be used as a distance measurement unless this ambiguity is resolved. The total path length from the satellite antenna to the receiver antenna is the sum of the receiver's measured fraction of a cycle and an unknown number of integer cycles.

The carrier phase measurements are the precise phase angle at which the receiver 4 and plurality of receivers 6 each receives the modulated carrier at a given point in time. The carrier phase occurs precisely once in the cycle of the carrier. The receiver has a carrier phase solution of n degrees, dependent on the number of cycles of the carrier within a specified duration. This often results in the ambiguity of determining which n-degree solution of the sinusoid within the specified duration is the correct solution. The ambiguity of the carrier phase solution remains within the error bounds of the code component 112. In some examples, the receiver also determines Doppler measurements which are the frequency offset caused by relative motion between the satellite and the receiver.

The receiver 4, 6 receives the broadcast signals from satellites 10. In some examples, a receiver may receive and broadcast signals to and from multiple GNSS systems. Each receiver receives the signals over one or more antennas (not shown) from at least three but typically four or more of satellites 10. The receivers perform code range and carrier phase range measurements from the timing and satellite orbital position information in the code component 112 and the digital data.

Receiver 4 and the plurality of receivers 6 may be or include any device/component capable of receiving and/or interpreting signals. These signals could be radio waves, electromagnetic signals, or other forms of transmission depending on the communication system. In some examples, receivers may include signal processing components which may be capable of filtering out unwanted noise. FIG. 1 illustrates the receiver 4 and plurality of receivers 6 as mobile phones, but a receiver device may be any device that includes or is connected to a GNSS antenna for obtaining GNSS data indicative of a position of the receiver device. As examples, a receiver may be or be associated with or included in a satellite phone, laptop computer, IoT device, vehicle, handheld GNSS unit, fitness tracker, marine or aviation GNSS device, cameras, unmanned underwater vehicle (UUV) or unmanned aerial vehicle (UAV), or smart watch. A receiver may be portable/mobile or stationary.

Each of receiver 4, 6 includes a GNSS receiver to communicate with satellites 10 using communication signals 114 to obtain GNSS data usable for position estimation. The GNSS data, including timing and satellite orbital position information, may be included in GNSS data 12, which is received by computing system 104. In some examples, each of receiver 4 and receivers 6 may send respective GNSS data 12 to computing system 104 using data channels via mobile network 140, the GNSS data 12 for use by computing system 104 in estimating a relative position of receiver 4. In some examples, receivers 6 may send respective GNSS data 12 to receiver 4 using data channels via mobile network 140, the GNSS data 12 for use by receiver 4 in estimating a relative position of receiver 4.

Receiver 4 may obtain a first set of measurements using signals from satellites 10, the first set of measurements indicating distances between the receiver 4 and the plurality of satellites 10. GNSS data 12 may include this first set of measurements. The plurality of receivers 6 may obtain a plurality of sets of measurements using signals from satellites 10, where each set of measurements of the plurality of sets of measurements includes data indicating distances between a corresponding receiver of the plurality of receivers 6 and the plurality of satellites 10. GNSS data 12 may include this plurality of sets of measurements.

Mobile network 140 includes one or more Radio Access Networks (RANs). The RANs may be access networks for 3rd Generation Partnership Project (3GPP) networks. Mobile network 140 may be a 3G, 4G/LTE, 5G network, for instance, or another type of mobile network.

Mobile network 140 includes base stations 142A-142N (collectively, "base stations 142"). In one example, a base station may be considered as an one implementation of a communication node in a mobile network. Each of base stations 142 includes a fixed radio transmitter and receiver that exchange radio signals with user equipment: receiver 4 and the plurality of receivers 6. Base stations 142 exchange communications with the core network of mobile network 140, which is operated by a mobile operator. Each of base stations 142 includes one or more antennas to transmit and receive radio signals. Each of base stations 142 may represent, for instance, a NodeB, eNodeB, gNodeB, or other type of base station or communication node performing similar functionality within a mobile network.

The antennas of each base station 142 are typically strategically positioned to cover specific geographic areas. Each antenna may be configured based on the geographic terrain, population density, and the amount of area desired to be covered. Specific communication channels 144 (i.e., specific frequency bands) are allocated for cellular communication to mitigate interference between different networks. In some examples, there may be specific frequency bands designated for uplink (communication of receiver to base station) and downlink (communication of base station to receiver).

Receiver 4 and plurality of receivers 6 may be user equipment in some examples. User equipment are devices for accessing and using mobile network services using a mobile network, e.g., mobile network 140. End users use user equipment to make calls, send texts, use data services, and access the internet or other networks and services over mobile network 140. Examples of user equipment include a smartphone, tablet, a vehicle or vehicle component with cellular connectivity, laptop with cellular connectivity, IoT device, mobile hotspot, or another device. Such vehicles may be autonomous, semi-autonomous, or non-autonomous. Each of user equipment includes a mobile/cellular transceiver that enables the transmission and reception of radio signals for communication with base stations 142 using communication channels 144.

In general, before transmission of information, the information may be modulated onto a carrier wave, altering the properties of the carrier wave to encode the information. In downlink communication a modulated signal may be sent through the base station's antenna and propagate through the air until it reaches the antenna of the desired receiver. The receiver antenna captures the signal, and the signal is then demodulated to extract the desired information. In uplink communication a modulated signal may be transmitted through the receiver's antenna and propagate through the air until it reaches the antenna of a base station. The base station's antenna captures the signal, and the signal is then demodulated to extract the desired information.

Communications between base stations 142 and receivers 4, 6 have certain properties including, but not limited to, time, angle, and range. These properties may be used to enable mobile networks to optimize their performance and in accordance with one or more aspects of this disclosure, are used to enhance estimating relative position of a receiver in a GNSS. In some examples, time properties of a signal may include measurements indicating the time of a signal's reception, transmission, and total duration. In another example, angle properties of a signal may indicate the angle or direction in which the signal arrived from. In another example, range properties may assist in determining the distance between the receiver and base station. Any of receivers 4, 6, or base stations 142 may obtain properties of communications between the receivers and base stations, and output such properties for use in estimating a relative position for receiver 4, in accordance with techniques of this disclosure. Base station measurement data 14 may include the data for these properties, such as time property data, angle property data, range property data for any of receivers 4, 6. Base station measurement data 14 may be received by computing system 104 or receiver 4. In some examples, each of receiver 4 and receivers 6 may send respective base station measurement data 14 to computing system 104 using data channels via mobile network 140, the base station measurement data 14 for use by computing system 104 in estimating a relative position of receiver 4. In some examples, receivers 6 may send respective base station measurement data 14 to receiver 4 using data channels via mobile network 140, the base station measurement data 14 for use by receiver 4 in estimating a relative position of receiver 4.

Network 145 couples mobile network 140 to computing system 104 and may include one or more PE routers, P routers, switches, and other network devices to implement an IP and/or L2 layer to transport IP and/or Ethernet packets. As examples, network 145 may represent an IP VPN or other Layer 3 VPN, the internet, a cloud service provider network, an IP Multimedia Subsystem (IMS), a data network or packet data network (PDN) for mobile network 140, or other layer 2 or layer 3 network. In some examples, computing system 104 is directly coupled to mobile network 140. In some examples, receiver 4 is or otherwise implements computing system 104.

In some examples, position estimate module 130 applies time domain recursive filtering to estimate the relative position of receiver 4 based on GNSS data 12 for the multiple receivers 6. In some examples, position estimate module 130 applies time domain recursive filtering to estimate the relative position of receiver 4 based on GNSS data 12 for the multiple receivers 6 and base station measurement data 14 for at least one of receiver 4 or multiple receivers 6. In some examples, position estimate module 130 applies time domain recursive filtering to estimate the relative position of receiver 4 based on base station measurement data 14 for at least one of receiver 4 or multiple receivers 6.

Computing system 104 includes position estimate module 130 using a Kalman filter 124, processing circuitry 120, and memory 122. Processing circuitry 120 and memory 122 may be configured to execute position estimate module 130 for estimating position according to techniques of this disclosure.

Computing system 104 comprises any suitable computing system having one or more computing devices, such as desktop computers, laptop computers, gaming consoles, smart televisions, handheld devices, tablets, mobile telephones, smartphones, etc. In some examples, at least a portion of computing system 104 is distributed across a cloud computing system, a data center, or across a network, such as the Internet, another public or private communications network, for instance, broadband, cellular, Wi-Fi, ZigBee, Bluetooth® (or other personal area network—PAN), Near-Field Communication (NFC), ultrawideband, satellite, enterprise, service provider and/or other types of communication networks, for transmitting data between computing systems, servers, and computing devices.

Memory 122 may store information for processing during operation of position estimate module 130. In some examples, memory 122 may include temporary memories, meaning that a primary purpose of the one or more storage devices is not long-term storage. Memory 122 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Memory 122, in some examples, also include one or more computer-readable storage media. Memory 122 may be configured to store larger amounts of information than volatile memory. Memory 122 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Memory 122 may store program instructions and/or data associated with one or more of the modules (e.g., position estimate module 130) described in accordance with one or more aspects of this disclosure.

Processing circuitry 120 and memory 122 may provide an operating environment or platform for position estimate module 130, which may be implemented as software, but may in some examples include any combination of hardware, firmware, and software. Processing circuitry 120 may execute instructions and memory 122 may store instructions and/or data of one or more modules. The combination of processing circuitry 120 and memory 122 may retrieve, store, and/or execute the instructions and/or data of one or more applications, modules, or software. Processing circuitry 120 and memory 122 may also be operably coupled to one or more other software and/or hardware components, including, but not limited to, one or more of the components illustrated in FIG. 1. Processing circuitry 120 and memory 122 may each be distributed over one or more computing devices.

Although illustrated and described as being a computing system that is separate from receivers 4, 6, receiver 4 may implement position estimate module 130. That is, the device for which position is estimated may include processing circuitry and memory to implement position estimate module 130, receive GNSS data 12 for other receivers, optionally receive base station measurement data 14, and compute a position estimate by applying time domain recursive filtering. In such cases, description attributed to computing system 104 herein should be understood to apply to receiver 4 (or device that includes receiver 4).

Computing system 104 can compute single or double differences of the code and carrier phase range measurements between antennas (i.e., as measured by the receivers). Single difference measurements involve signals received by two receiver antennas from one satellite 10; double difference measurements involve signals received by two receiver antennas from two satellites 10. Double difference measurements are used to eliminate the effects of receiver clock, satellite clock, and ephemeris inaccuracies. In some examples, the double difference measurements may be determined from the receiver 4 and each of the plurality of receivers 6. The double differences may be formed or computed in accordance with any known technique for computing double differences.

Receiver 4 and plurality of receivers 6 are communicatively coupled to mobile network 140 and computing system 104 is communicatively coupled to network 145. Network 145 couples mobile network 140 to computing system 104 allowing receiver 4, plurality of receivers 6, and computing system 104 to share/communicate information. In some examples, the receivers send their code measurements and carrier phase measurements to the computing system 104 via networks 140 and 145. Computing system 104 uses these measurements to estimate the relative position of receiver 4 relative to plurality of receivers 6. The computing system 104 may send the estimated relative position to receiver 4 and/or one or more of plurality of receivers 6 via networks 140 and 145.

In accordance with one or more aspects of the disclosure, in one example, computing system 104 obtains a set of measurements for receiver 4 and a plurality of sets of measurements for the plurality of receivers 6, via networks 140 and 145. The first set of measurements may be included in GNSS data 12 and indicate distances between receiver 4 and satellites 10. The plurality of sets of measurements for the plurality of receivers 6 may be included in GNSS data 12 and indicate corresponding sets of distances between each of receivers 6 and satellites 10. Position estimate module 130 of computing system 104 may performs time domain recursive filtering using the first set of measurements for receiver 4 and the plurality of sets of measurements for plurality of receivers 6. This filtering may produce at least one set of double difference float ambiguities, where each double difference float ambiguity in the set is averaged over a period of time. Position estimate module 130, based on the time domain recursive filtering, may then estimate the position of receiver 4 relative to the plurality of receivers 6.

In one example, forming the double differences may occur in subsets and may stop once the float ambiguities have been resolved to a number of integer cycles.

In some examples, the computing system 104 obtains a set of measurements for receiver 4 and a plurality of sets of measurements for plurality of receivers 6, via networks 140 and 145. The first set of measurements may be included in base station measurement data 14 and indicate one or more of time, angle, and range information between receiver 4 and a base station 142 of mobile network 140. Each of the plurality of sets of measurements for plurality of receivers 6 may be included in base station measurement data 14 and indicate one or more of time, angle, and range information between a corresponding receiver of the plurality of receivers 6 and a base station 142. The computing system 104 may perform time domain recursive filtering in accordance with the data indicating the time, angle, and range information.

Receiver 4 and plurality of receivers 6 may include sensors, such as a camera, thermometer, barometer, accelerometer, and/or microphone. In one example, the set of measurements for receiver 4 and the plurality of sets of measurements for plurality of receivers 6 may comprise image data from a corresponding receiver indicating an orientation of the receiver. In another example, the set of measurements from receiver 4 and the plurality of sets of measurements for the plurality of receivers 6 may comprise data indicating one or more of temperature, pressure, acceleration, and/or sound of a corresponding receiver. The computing system 104 may perform time domain recursive filtering in accordance with the data indicating one or more of the orientation, temperature, pressure, acceleration, or sound of the receiver.

In another example, at least one of the set of measurements for receiver 4 and the plurality of sets of measurements from the plurality of receivers 6 comprises single frequency measurements.

Position estimate module 130 of computing system 104 may perform time domain recursive filtering and estimate double difference float ambiguities. In one example, the filtering is performed using Kalman filter 124. Kalman filter 124 estimates the internal state of a linear dynamic system from a series of noisy measurements. It may be an algorithm that uses measurements and applies algorithms to change the measurements to state data. The state data can be further manipulated to provide the desired data. The algorithm forms estimates of its outputs that take into account the accuracy of the data based on an estimate of the accuracy of the state. In some examples, the algorithm may include heuristics. Heuristics may modify the input data and state changes to consider knowledge of the system or other prior knowledge. For example, if the maximum likely velocity of a receiver is known we may reject information contrary to this knowledge. The Kalman filter is considered a model that includes states, measurements, measurement error, and transformation of the state into observables.

In one example, the states of Kalman filter 124 may include one or more of: time, relative velocity (i.e., the velocity of the first receiver relative to the plurality of receivers), absolute velocity, relative position (i.e., the position of the first receiver relative to the plurality of receivers), absolute position, relative acceleration, absolute acceleration, and the set of double difference float ambiguities computed from the set of measurements for receiver 4 and the plurality of sets of measurements for the plurality of receivers 6. In some examples, the double difference float ambiguities are single frequency double difference float ambiguities. However, the same approach is effective for use with double-frequency receivers.

In another example, the states of Kalman filter 124 may include, at a minimum per geolocated object, time, position, velocity, acceleration, clock offset, rate of clock offset, angle, and ranging information. In some examples, near field communication, Wi-Fi, and Bluetooth signals may provide the ranging information. In yet another example, any sensor measurements (e.g., accelerometer data generated by an accelerometer sensor) that is related to position and the mathematical transformation of that sensor output (e.g., acceleration to velocity) may be a state of the Kalman filter. A sensor measurement may further include automobile sensors, such as radars, lidars, and optical sensors. The filter may also accept inputs such as psuedoranges, carrier phase, estimated signal to noise ratio, and external data (e.g., antenna position). Each base station and satellite may have measurements for position, velocity, acceleration, clock offset, and rate of clock drift.

While Kalman filter 124 may not have a measurement for each of these states for every iteration, the states can still be maintained, and the filter will proceed with the information it has. This may be used in large systems where communications delay may be present. In one example, phones may choose to cycle GNSS measurements on and off to conserve battery.

In one example, performing the time domain recursive filtering comprises performing a code averaging for a code component of the set of measurements for receiver 4 and the plurality of sets of measurements for the plurality of receivers 6 over a common period of time.

In general, a Kalman filter is designed to include all possible knowledge of the systems it models to provide the most accurate solution. As such, Kalman filter 124 exploits a trusted model of the dynamics of receiver 4, which describes the kind of movement possible by receiver 4, to remove the effects of the noise and get a good estimate of the relative position of receiver 4. In one example, noise may be considered additive measurement inaccuracies that tend to even out with multiple measurements. The noise may comprise measurement noise or process noise. The measurement noise may be based on satellite elevation, receiver noise estimation, and receiver speed. In this case, the satellites 10 are weighted more favorably when the receiver 4 is in motion. This is advantageous because the signal multipath (i.e., the propagation of the signal to the receiver 4 along two or more paths) is typically reduced as a function of receiver dynamics (e.g., when a vehicle in which the receiver 4 is mounted is moving). In a GNSS, the multipath effect can cause a stationary receiver's output to appear as if it is randomly jumping or creeping. When the receiver is moving, the jumping or creeping is hidden, but it still degrades the accuracy.

Once individual noise estimations are made, a measurement noise variance matrix formulation is produced. The measurement noise variance matrix may be the standard noise measurement matrix that is common to Kalman filters. The measurement noise variance matrix is used to add uncertainty to the position estimate between measurement updates.

In some examples, removing the one or more effects of noise in at least one measurement of the set of measurements for receiver 4 or the plurality of sets of measurements for the plurality of receivers 6 involves performing a computation that weighs multipath signals from the plurality of satellites based on speeds of at least one of receivers.

In addition, the double difference float ambiguities can be constant over time. Thus, Kalman filter 124 may averages the double difference ambiguities over time.

If lock on a satellite 10 is lost from the receiver 4 or the plurality of receivers 6, then the double difference float ambiguities are re-initialized. Re-initializing Kalman filter 124 in this way forces the smoothing time of the code to be the same for each individual satellite 10 and each receiver. This effectively minimizes the effects of ionospheric divergence common in some types of time domain filtering. Because relative position is one of the Kalman filter states, when a satellite 10 is lost and reacquired in this way, the double difference float ambiguities can be accurately restored.

Computing system 104 estimates the relative position of the receiver 4 as a function of time, in accordance with the time domain recursive filtering (e.g., as implemented using Kalman filter 124 in the example of FIG. 1). Computing system 104 outputs the relative position of the receiver 4 as estimate 16. In addition, the computing system 104 may output the estimated relative position to one or more of the plurality of receivers 6. In some examples, computing system 104 may comprise one of the receiver 4, plurality of receivers 6, or a remote computing system. Estimate 16 may be used by receiver 4 to modify its trajectory, output an estimated position to a display device, perform mapping, geolocation, targeted advertising, or other action.

After the solution has converged to a specified uncertainty, an ambiguity resolution algorithm can be run using the double difference float ambiguities and the covariance produced by the filter to attempt to fix the float ambiguities to their integer values.

As discussed above, the double difference ambiguities are known to be constant over time. Thus, the Kalman filter 124 estimates the double difference ambiguities over time. This multi-epoch approach allows one to accurately estimate the relative position of a single-frequency receiver by using time domain filtering of the single-frequency measurements. Over time, the accuracy of the estimate will improve further.

Figure 2:
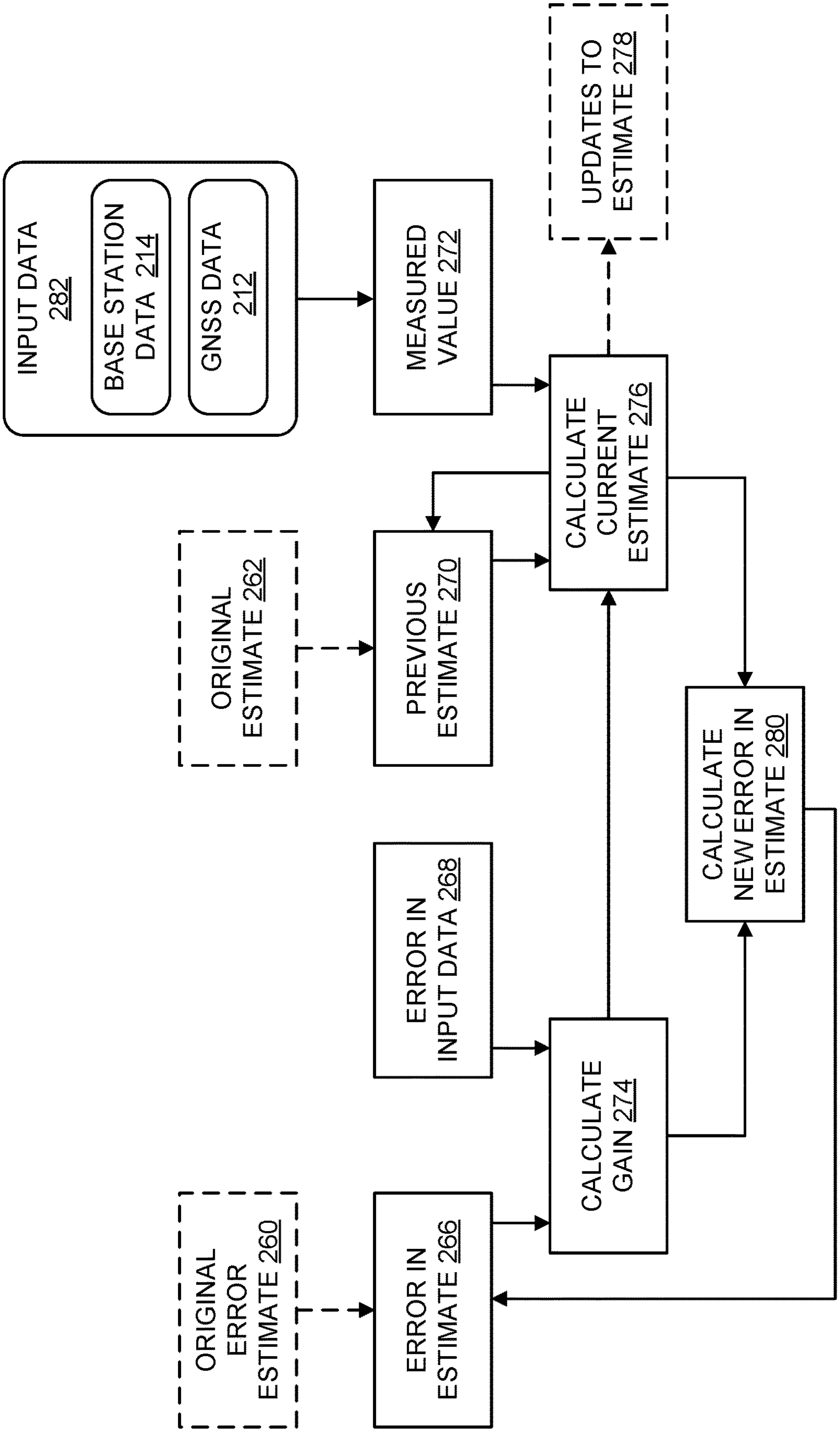
FIG. 2 is a block diagram illustrating an example time domain recursive filter, in accordance with the techniques of the disclosure.

FIG. 2 is a block diagram illustrating example time domain recursive filtering, in accordance with techniques of the disclosure. The filter iteratively calculates the gain 274, the current estimate 276, and the new error in the estimate 280 to generate updates to the estimate 278. Kalman filter 124 may implement the time domain recursive filtering depicted in FIG. 2.

The error in the estimate 266 or, in the case of the first iteration, the original error estimate 260, and the error in the input data 268 may be used to calculate the gain 274. The error in the input data 268 is representative of the error in input data 282. The gain 274 (i.e., the Kalman gain) determines a relative importance, based on the error in estimate 266 and error in input data 268, for the calculation of the current estimate 276.

Calculation of the current estimate 276 relies upon the gain 274, as well as the previous estimate 270 and measured value 272. In some examples, for the first iteration of the filter, the previous estimate 270 will be the original estimate 262. After the first iteration, a feedback loop from the current estimate 276 supplies the previous estimate 270. Measured value 272 consists of input data 282.

In some examples, input data 282 may include one or more of base station data 214 or GNSS data 212. Although not shown, input data 282 may also include data indicating one or more of an orientation, temperature, pressure, acceleration, or sound associated with a receiver. In some examples, the input data 282 may comprise the set of measurements for receiver 4 and the plurality of sets of measurements for receivers 6. The time domain recursive filtering may comprise applying Kalman filter 124 to this input data 282.

The gain will indicate the relative importance (i.e., weight) that should be placed on the previous estimate 270 and the measured value 272 in the calculation of the current estimate 276. For example, if the error in the estimate 266 is smaller than the error in the input data 268, the gain 274 may indicate that more importance should be placed on the previous estimate 270 versus the measured value 272 for calculating the current estimate 276.

Based upon the gain 274 and the current estimate 276, the filter may calculate a new error in the estimate 280 and feed this value back to the error in estimate 266.

Each time this iterative filter process illustrated by FIG. 2 is performed, updates to the estimate 278 are output. With each iteration, the value of the estimate 278 may become more accurate.

In some examples, observations that are input into the time domain recursive filter include Doppler estimate (range rate), carrier phase, and code phase for each signal received by the receivers. Further inputs into the filter may include satellite ephemeris (position, velocity, clock offset, and clock drift as a function of time) and the equivalent data for the base stations.

Figure 3:
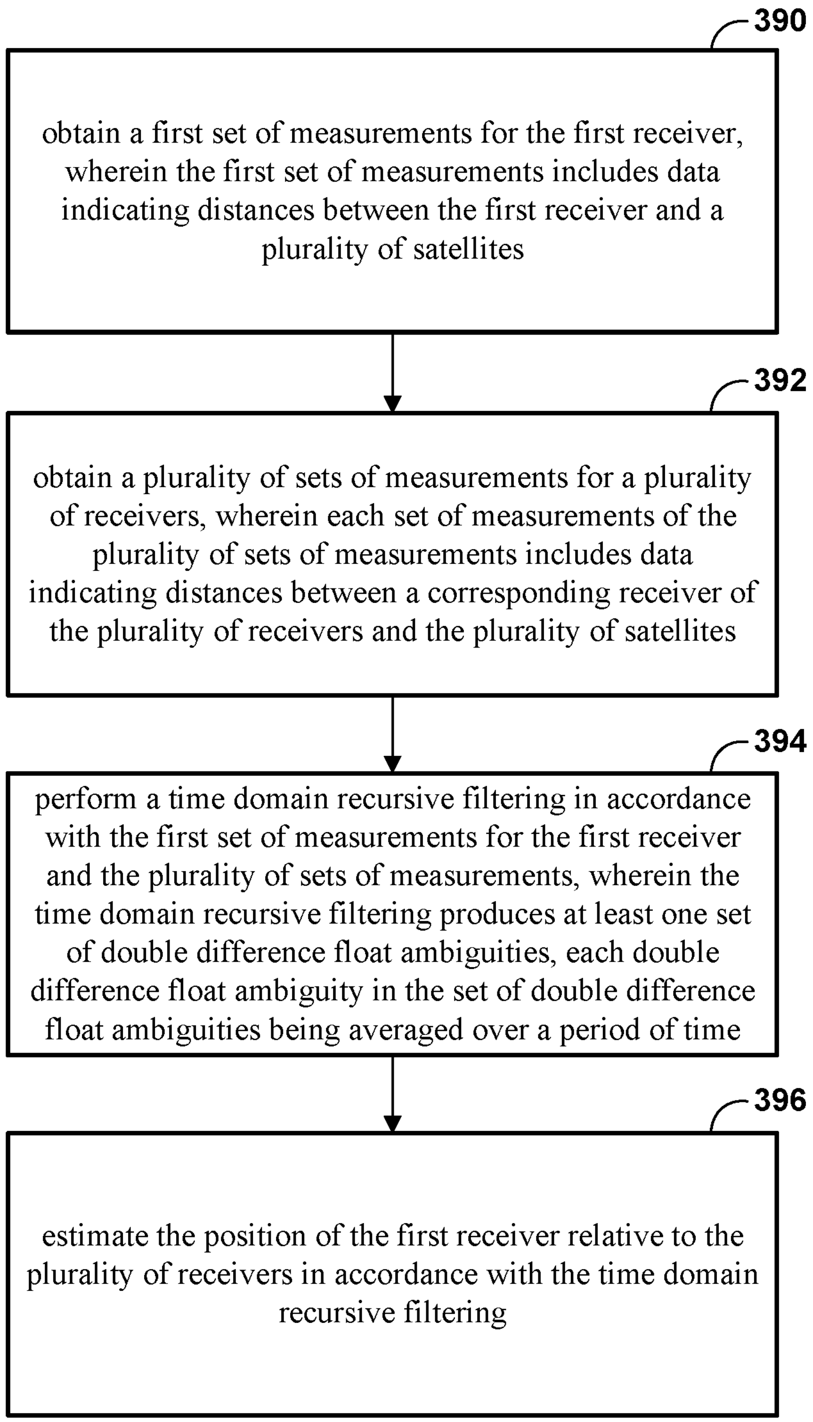
FIG. 3 is a flowchart illustrating an example mode of operation for estimating a relative position of a receiver in a global navigation satellite system (GNSS) using time domain recursive filtering applied to GNSS data for an additional plurality of receivers, in accordance with techniques of the disclosure.

FIG. 3 is a flowchart illustrating an example mode of operation for estimating a relative position of a receiver in a global navigation satellite system (GNSS) using time domain recursive filtering applied to GNSS data for an additional plurality of receivers, in accordance with the techniques of the disclosure.

In the example of FIG. 1, position estimate module 130 may obtain a first set of measurements for a first receiver (390). The first set of measurements may include data indicating distances between the first receiver (e.g., receiver 4 of FIG. 1) and a plurality of satellites (e.g., satellites 10 of FIG. 1). The position estimate module 130 may obtain a plurality of sets of measurements for a plurality of receivers (e.g., receivers 6 of FIG. 1) (392). Each set of measurements of the plurality of sets of measurements includes data indicating distances between a corresponding receiver of the plurality of receivers 6 and the plurality of satellites 10.

In the example of FIG. 2, position estimate module 130 may perform a time domain recursive filtering (394). The time domain recursive filtering may be in accordance with the first set of measurements for the first receiver and the plurality of sets of measurements. The time domain recursive filtering may produce at least one set of double difference float ambiguities, each double difference float ambiguity in the set of double difference float ambiguities being averaged over a period of time. Position estimate module 130, may estimate the position of the first receiver relative to the plurality of receivers in accordance with the time domain recursive filtering (396).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components. Further, any of the described algorithms, models, or filters may be implemented with partial data. In the event of data loss a robust estimation may still be provided.

The techniques described in this disclosure may also be embodied or encoded in computer-readable media, such as a computer-readable storage medium, containing instructions. Instructions embedded or encoded in one or more computer-readable storage mediums may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method for estimating a position of a first receiver, the method comprising:

obtaining, by a computing system, a first set of measurements for the first receiver, wherein the first set of measurements includes data indicating distances between the first receiver and a plurality of satellites;

obtaining, by the computing system, a plurality of sets of measurements for a plurality of receivers, wherein each set of measurements of the plurality of sets of measurements includes data indicating distances between a corresponding receiver of the plurality of receivers and the plurality of satellites;

performing, by the computing system, a time domain recursive filtering based on applying a Kalman filter to the first set of measurements for the first receiver and the plurality of sets of measurements, wherein the Kalman filter includes a plurality of states including a set of double difference float ambiguities and the position of the first receiver relative to each of the plurality of receivers;

updating, by the computing system and based on the Kalman filter, the plurality of states including the set of double difference float ambiguities and the position of the first receiver relative to each of the plurality of receivers, wherein each double difference float ambiguity in the set of double difference float ambiguities is averaged over a period of time;

estimating, by the computing system and based on the updated plurality of states, the position of the first receiver relative to each of the plurality of receivers; and performing, by the first receiver, an action based on the estimated position of the first receiver.

2. The method of claim 1, wherein the first set of measurements and one or more of the plurality of sets of measurements comprise data indicating one or more of time, angle, and range information for communications between the corresponding receiver and a base station of a mobile network, and wherein performing the time domain recursive filtering includes performing the time domain recursive filtering based on applying the Kalman filter to the data indicating the one or more of time, angle, and range information.

3. The method of claim 1, wherein the first set of measurements and each of the plurality of sets of measurements comprises one or more images for the corresponding receiver indicating an orientation of the corresponding receiver, and wherein performing the time domain recursive filtering includes performing the time domain recursive filtering based on applying the Kalman filter to the one or more images.

4. The method of claim 1, wherein the first set of measurements and each of the plurality of sets of measurements comprise data indicating one or more of orientation, temperature, air pressure, acceleration, or sound associated with the corresponding receiver, and wherein performing the time domain recursive filtering includes performing the time domain recursive filtering based on applying the Kalman filter to the data indicating the one or more of the temperature, air pressure, acceleration, and sound of the corresponding receiver.

5. The method of claim 1, wherein the plurality of states further comprises a velocity of the first receiver relative to the plurality of receivers, and wherein the set of double difference float ambiguities is computed from the first set of measurements and the plurality of sets of measurements.

6. The method of claim 1, wherein at least one of the first set of measurements and the plurality of sets of measurements comprises single-frequency measurements.

7. The method of claim 1, wherein the computing system comprises one of the first receiver or a remote computing system.

8. The method of claim 1, wherein the performing the time domain recursive filtering comprises:

performing a code averaging for a code component of the first set of measurements and the plurality of sets of measurements over a common period of time.

9. The method of claim 1, further comprising: removing one or more effects of noise in at least one measurement of the first set of measurements or the plurality of sets of measurements, wherein the removing involves performing a computation that weighs multipath signals from the plurality of satellites based on a speed of at least one of the corresponding receiver.

10. A computing system comprising processing circuitry and memory, the memory comprising instructions executable to cause the processing circuitry to:

obtain a first set of measurements for a first receiver, wherein the first set of measurements includes data indicating distances between the first receiver and a plurality of satellites;

obtain a plurality of sets of measurements for a plurality of receivers, wherein each set of measurements of the plurality of sets of measurements includes data indicating distances between a corresponding receiver of the plurality of receivers and the plurality of satellites;

perform a time domain recursive filtering based on applying a Kalman filter to the first set of measurements for the first receiver and the plurality of sets of measurements, wherein the Kalman filter includes a plurality of states including a set of double difference float ambiguities and a position of the first receiver relative to each of the plurality of receivers;

update, based on the Kalman filter, the plurality of states including the set of double difference float ambiguities and the position of the first receiver relative to each of the plurality of receivers, wherein each double difference float ambiguity in the set of double difference float ambiguities is averaged over a period of time;

estimate, based on the updated plurality of states, the position of the first receiver relative to each of the plurality of receivers; and perform an action based on the estimated position of the first receiver.

11. The computing system of claim 10, wherein the first set of measurements and one or more of the plurality of sets of measurements comprise data indicating one or more of time, angle, and range information for communications between the corresponding receiver and a base station of a mobile network, and wherein to perform the time domain recursive filtering the instructions cause the processing circuitry to: perform the time domain recursive filtering based on applying the Kalman filter to the data indicating the one or more of time, angle, and range information.

12. The computing system of claim 10, wherein the first set of measurements and each of the plurality of sets of measurements comprise images for the corresponding receiver indicating an orientation of the corresponding receiver, and wherein to perform the time domain recursive filtering the instructions cause the processing circuitry to: perform the time domain recursive filtering based on applying the Kalman filter to the images.

13. The computing system of claim 10, wherein the first set of measurements and each of the plurality of sets of measurements comprise data indicating one or more of orientation, temperature, air pressure, acceleration, or sound associated with the corresponding receiver, and wherein to perform the time domain recursive filtering the instructions cause the processing circuitry to: perform the time domain recursive filtering based on applying the Kalman filter to the data indicating the one or more of the temperature, air pressure, acceleration, and sound of the corresponding receiver.

14. The computing system of claim 10, wherein the plurality of states further comprise: a velocity of the first receiver relative to the plurality of receivers, and wherein the set of double difference float ambiguities is computed from the first set of measurements and the plurality of sets of measurements.

15. The computing system of claim 10, wherein to perform the time domain recursive filtering the instructions cause the processing circuitry to:

perform a code averaging for a code component of the first set of measurements and the plurality of sets of measurements over a common period of time.

16. The computing system of claim 10, wherein the instructions cause the processing circuitry to remove one or more effects of noise in at least one measurement of the first set of measurements or the plurality of sets of measurements, and wherein to remove the one or more effects of noise the instructions cause the processing circuitry to: perform a computation that weighs multipath signals from the plurality of satellites based on a speed of at least one of the corresponding receiver.

17. Computer-readable storage media comprising instructions that, when executed by processing circuitry, cause the processing circuitry to:

obtain a first set of measurements for a first receiver, wherein the first set of measurements includes data indicating distances between the first receiver and a plurality of satellites;

obtain a plurality of sets of measurements for a plurality of receivers, wherein each set of measurements of the plurality of sets of measurements includes data indicating distances between a corresponding receiver of the plurality of receivers and the plurality of satellites;

perform a time domain recursive filtering based on applying a Kalman filter to the first set of measurements for the first receiver and the plurality of sets of measurements, wherein the Kalman filter includes a plurality of states including a set of double difference float ambiguities and a position of the first receiver relative to each of the plurality of receivers;

update, based on the Kalman filter, the plurality of states including the set of double difference float ambiguities and the position of the first receiver relative to each of the plurality of receivers, wherein each double difference float ambiguity in the set of double difference float ambiguities being averaged over a period of time;

estimate, based on the updated plurality of states, the position of the first receiver relative to each of the plurality of receivers; and perform an action based on the estimated position of the first receiver.

18. The method of claim 1, further comprising:

determining, by the computing system and based on comparing the plurality of sets of measurements for the plurality of receivers, that a second receiver of the plurality of receivers is dominated by multipath; and removing, the data indicating a distance between the second receiver and the plurality of satellites from the plurality of sets of measurements.

19. The method of claim 18, wherein determining that the second receiver of the plurality of receivers is dominated by multipath further comprises:

determining, by the computing system and based on comparing one or more of pseudorange, Doppler, or carrier phase of the plurality of sets of measurements for the plurality of receivers, an apparent angle of incoming energy from a satellite associated with the second receiver.

20. The method of claim 1, wherein performing the action comprises:

modifying, based on the estimated position, one or more of a trajectory, a displayed estimated position, a mapping, a geolocation, or a targeted advertisement associated with the first receiver.

* * * * *